United States Patent
Sasaki

(10) Patent No.: US 6,308,296 B1
(45) Date of Patent: Oct. 23, 2001

(54) CODED IMAGE RECORDING DEVICE AND METHOD

(75) Inventor: Hiroshi Sasaki, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/224,833

(22) Filed: Jan. 4, 1999

(30) Foreign Application Priority Data

Jan. 30, 1998 (JP) .................................................. 10-018975

(51) Int. Cl.$^7$ ........................................................ G11L 29/00
(52) U.S. Cl. ............................................................ 714/763
(58) Field of Search ..................................... 714/752, 763, 714/701, 702; 386/100; 382/235; 369/47

(56) References Cited

U.S. PATENT DOCUMENTS

| | | | | |
|---|---|---|---|---|
| 4,500,926 | * | 2/1985 | Yoshimaru | 358/431 |
| 5,719,886 | * | 2/1998 | Matsui et al. | 714/763 |
| 5,841,793 | * | 11/1998 | Fukuda | 714/752 |
| 5,898,709 | * | 4/1999 | Imade et al. | 714/763 |
| 6,043,899 | * | 3/2000 | Morohashi et al. | 358/1.18 |
| 6,134,695 | * | 10/2000 | Sasaki et al. | 714/752 |

FOREIGN PATENT DOCUMENTS

| | | |
|---|---|---|
| 0 670 555 A1 | 9/1995 | (EP) . |
| 0 703 580 A2 | 3/1996 | (EP) . |
| 0 713 194 A1 | 5/1996 | (EP) . |

\* cited by examiner

*Primary Examiner*—Albert Decady
*Assistant Examiner*—Shelly A Chase
(74) *Attorney, Agent, or Firm*—Frishauf, Holtz, Goodman, Langer & Chick, P.C.

(57) ABSTRACT

The present invention is directed to take measures against linear scratches and improve the recording density per unit code length. That is, a coded image recording device which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprises a dummy data generating unit for, when imaging each block data as a block, generating dummy data whose amount is less than the predetermined amount of data and which is not associated with the data to be recorded and inserting it into a block in which its block data amount is less than the predetermined amount of data.

16 Claims, 15 Drawing Sheets

CODED IMAGE RECORDING DEVICE AND METHOD

BACKGROUND OF THE INVENTION

The present invention relates to a coded image recording device and method for recording optically readable coded images on the surface of a recording medium such as paper.

As a conventional coded image recording device which records an optically readable coded image on a recording medium (paper in particular), there is a technique of recording a coded image comprising multiple blocks having a physical format on paper, which is disclosed in EP No. 0,670,555A1(U.S. Ser. No. 08/407,018) now U.S. Pat. No. 5,896,703 assigned to the same assignee as this invention. This recording device records multimedia information, such as sound, images, text, etc., as a coded image and can be adapted to varying amounts of data in input multimedia information by increasing the number of blocks, each of which constitutes a physical minimum storage unit, according to the data amount.

Each of the blocks has an ID number referred to as a block address. A coded image is recorded on paper by concatenation of a plurality of blocks. An increase in the number of blocks that can be concatenated leads to an increase in the amount of recordable information. However, the use of an optical reader of a manual scanning type will increase the probability of the occurrence of a read error due to meanderings of scanning attendant an increase in scanning range. Such a read error will produce frequently dropouts of blocks, i.e., so-called burst errors, which makes difficult a reliable read operation by manual scanning.

In view of the prior art problem, EP No. 0,713,914A1 (U.S. Ser. No. 08/586,792) now U.S. Pat. No. 5,898,709 by way of example discloses a technique related to a logical data format that allows even a manual-scanning reader to read data recorded in blocks with more certainty and a coded image recording device that produces and records a coded image based on the logical data format.

Hereinafter, the arrangement of such a coded image recording device will be described with reference to FIG. 15.

In this figure, the data input unit and the code printing unit are omitted because they are not directly related to the present invention to be described later.

In FIG. 15, digitized multimedia information is entered into a data compression unit 21, which receives from a controller 29 identification information that represents the type of sound, images, or text. By this identification information, one of compressors in the data compression unit is selected, thereby subjecting the input multimedia information to compression corresponding to the identification information and producing desired compressed data. In the structure of the compressed data, a header is added which defines the data type, the compression scheme, and the compressed data amount. The amount of compressed data with such a header is presented to the controller 29.

A dummy data generation unit 23 generates dummy data which is added so that supermacroblock data 191 shown in FIG. 16 is divisible by one macroblock data in a macroblock data group 193. Here, a supermacroblock, a macroblock and block data used in the following description correspond to data, a first block, and a second block (or simply a block), respectively. In addition, macroblock user data and block user data correspond to first block data and second block data (or unit block data), respectively. All these expressions are used in the following description.

The compressed data and the dummy data are entered into an error correcting code generator 22, which receives correction capability information from the controller 29. The error correcting code generator 22 adds given error correcting and checking parity to the compressed data having a data amount determined according to the error capability information and generates correcting codes. The correcting code length and the parity length corresponding to the correction capability are sent to an interleave unit 24 and a macroblock header generator 25. The correcting codes thus generated are entered into the interleave unit 24 and stored in sequence into a buffer memory (not shown) in the interleave unit on the basis of the input correcting code length. The logical data format of a group of the correcting codes thus stored has a two-dimensional structure as shown in supermacroblock data 191 of FIG. 16. The number of the correcting codes corresponds to the interleave length.

EP No. 0,713,914A1(U.S. Ser. No. 08/586,792) describes that supermacroblock data is an integral multiple of macroblock data, but does not describe any specific structure of the supermacroblock data. A specific structure of the supermacroblock data is described in EP No. 0,703,580A2. In the technique disclosed in this publication, dummy data is appended to compressed data so that supermacroblock data is an integral multiple of macroblock data and correcting parity is affixed to the dummy data with the dummy data taken as part of the compressed data.

The supermacroblock data 191 has dummy data added to the end of compressed data to form a given size of supermacroblock data. Here, the dummy data may be a predetermined fixed value or a random number generated in accordance with a predetermined rule. The supermacroblock data 191 is written into the buffer in the direction of correcting code length and read from the buffer into a macroblock data generator 26 in the direction of the interleave length. Thereby, interleave processing is completed, so that logically one-dimensional supermacroblock data 192 is produced. The interleave length is presented to the macroblock header generator 25.

The macroblock header generator 25 produces a header based on the input correcting code length, parity length, and interleave length, and the ID number of the supermacroblock and the ID number of a macroblock output from the controller 29, i.e., information representing how the macroblocks are concatenated to form a supermacroblock. Error correcting parity is appended to produce a final macroblock header. The macroblock header is output to the macroblock data generator 26.

In the macroblock data generator 26, the one-dimensional supermacroblock data 192 after interleave is divided into pieces of macroblock user data each corresponding to macroblock data having a given data amount. Each piece of macroblock user data is assigned a macroblock header to produce a group of macroblock data 193. The macroblock data group 193 is entered into a block data generator 27 where each macroblock data is divided into multiple pieces of block user data.

Each piece of block user data comprises data obtained by dividing each of the macroblock header and macroblock user data by the number of pieces of block data in each macroblock data.

A block header is appended to each piece of block user data, thus producing a block data group 194. The block header contains block-related header information such as a block address.

The block data group 194 is entered into a coded image generator 28, which converts each block data into a block comprised of markers 112, pattern codes 113, block headers 114, and block user data 115 as shown in FIG. 3, and produces a code image in which multiple blocks are concatenated. The block user data 115 is recording modulated to discriminate between data 115 and markers 112 and recorded in black and white dots each for a bit.

The above-described conventional technique appends control information that makes each of the interleave length and the error correcting capability variable according to the amount of data in the input multimedia information, i.e., a macroblock header, for each macroblock by way of example and thereby checks an increase in the percentage of multimedia information of the control information, i.e., a reduction in recording density, to a minimum. Thus, the reader can detect the control information with more certainty.

Hereinafter, the reason will be described taking others than the above-described technique by way of example will be described.

First, in the conventional technique, when the control information is recorded in a given block, for example, a block whose block address is one, the importance of the block recorded with the control information increases very greatly as compared with the other blocks. With the manual scanning-based reader, the reading accuracy for a specific block cannot be increased and there is the possibility of misreading any of the blocks.

Thus, it cannot be said that the probability of the block recorded with the control information being misread is low enough. In other words, the frequency that a supermacroblock cannot be reconstructed increases.

Second, when each block contains the control information, the evenness of the importance of each block is achieved and the control information can be extracted with certainty even if some block is misread. However, this approach results in an increase in the percentage of multimedia information to be recorded relative to the control information. Thus, the recording density per unit code length is reduced.

In the conventional technique, the supermacroblock data 191 corresponds in size to an integral multiple of each block. Thus, data forming one correcting code in the simple two-dimensional supermacroblock data 191 may be recorded on the same location in each block 111. This occurs in the case where the amount of data stored in each block in the supermacroblock data 191 corresponds to either a submultiple or a multiple of the interleave length.

If, under such a condition, a coded image is formed by multiple blocks into a rectangular shape, the error correcting code data are arranged in lines in the horizontal and vertical directions. If linear scratches should be produced in the vertical and horizontal directions, the probability that errors are produced in numbers beyond correcting capability in each correcting code would increase. That is, the reader becomes extremely affected by linear scratches in the horizontal and vertical directions.

In particular, when printing a coded image with a printing device in which the paper feeding accuracy is poor or the accuracy of scanning by a printing head is poor, unevenness of printing occurs in a direction perpendicular to the printing head scanning direction or the paper feeding direction. The unevenness of printing appears in the form of linear scratches 133 and 134 in the horizontal and vertical directions on a code 132 recorded on paper 131 as shown in FIG. 6. Errors will be produced in data corresponding in location to the scratches 133 and 134. With such a printing device, there arises a problem that a code cannot be read fully.

By making up a macroblock of as many blocks as possible, the amount of data in control information allocated to each block can be reduced to increase the recording density per unit code. On the other hand, when the amount of data in input multimedia information (after correcting parity has been appended) is not divisible by the amount of data that can be stored in each macroblock, much useless dummy data is inserted into supermacroblock data prior to interleaving. This is due to the premise that supermacroblock data corresponds in size to an integral multiple of macroblock data. The useless dummy data are scattered over a coded image after interleaving and are all recorded. That is, the dummy data will take up unnecessarily a recording medium, e.g., paper surface. This imposes a constraint on the restricted layout of paper.

BRIEF SUMMARY OF THE INVENTION

It is the object of the present invention to provide a coded image recording device and method which is resistant to linear scratches in the horizontal and vertical directions, eliminates useless dummy data, and keeps down the percentage taken up by control information for variable interleave length and variable correcting capability in multimedia information to thereby keep the recording density per unit code length from lowering.

According to a first aspect of the present invention there is provided a coded image recording device which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising: dummy data inserting means for, when imaging each block data as a block, inserting dummy data whose amount is less than the predetermined amount of data and which is not associated with the data to be recorded into a block in which its block data amount is less than the predetermined amount of data.

According to a second aspect of the present invention there is provided a coded image recording device which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising: first block producing means for producing a plurality of first blocks each containing a first predetermined amount of first block data, the first block data being obtained by dividing the data into equal amounts of data; dummy data inserting means for inserting dummy data whose amount is less than the first predetermined amount of data and which is not associated with the data to be recorded into a block, of the plurality of first blocks produced by the first block producing means, in which its block data amount is less than the first predetermined amount of data; second block producing means for producing a plurality of second blocks each containing a second predetermined amount of second block data, the first block data being obtained by dividing each first block data into equal amounts of data; block decision means for making a valid/invalid decision for each of the second blocks produced by the second block producing means, a second block whose second block data are all the dummy data being decided as an invalid block;

and control means for keeping a second block or blocks for which the valid/invalid decision is invalid from being recorded and imaging the other second blocks for recording.

According to a third aspect of the present invention there is provided a coded image recording method which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising:

a dummy data inserting step for, when imaging each block data as a block, inserting dummy data whose amount is less than the predetermined amount of data and which is not associated with the data to be recorded into a block in which its block data amount is less than the predetermined amount of data.

According to a fourth aspect of the present invention there is provided a coded image recording method which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising:

a first step of producing a plurality of first blocks each containing a first predetermined amount of first block data, the first block data being obtained by dividing the data into equal amounts of data;

a second step of inserting dummy data whose amount is less than the first predetermined amount of data and which is not associated with the data to be recorded into a block, of the plurality of first blocks produced by the first step, in which its block data amount is less than the first predetermined amount of data;

a third step of producing a plurality of second blocks each containing a second predetermined amount of second block data, the first block data being obtained by dividing each first block data into equal amounts of data;

a fourth step of making a valid/invalid decision for each of the second blocks produced by the second step, a second block whose second block data are all the dummy data being decided as an invalid block; and a fifth step of keeping a second block or blocks for which the valid/invalid decision is invalid from being recorded and imaging the other second blocks for recording.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
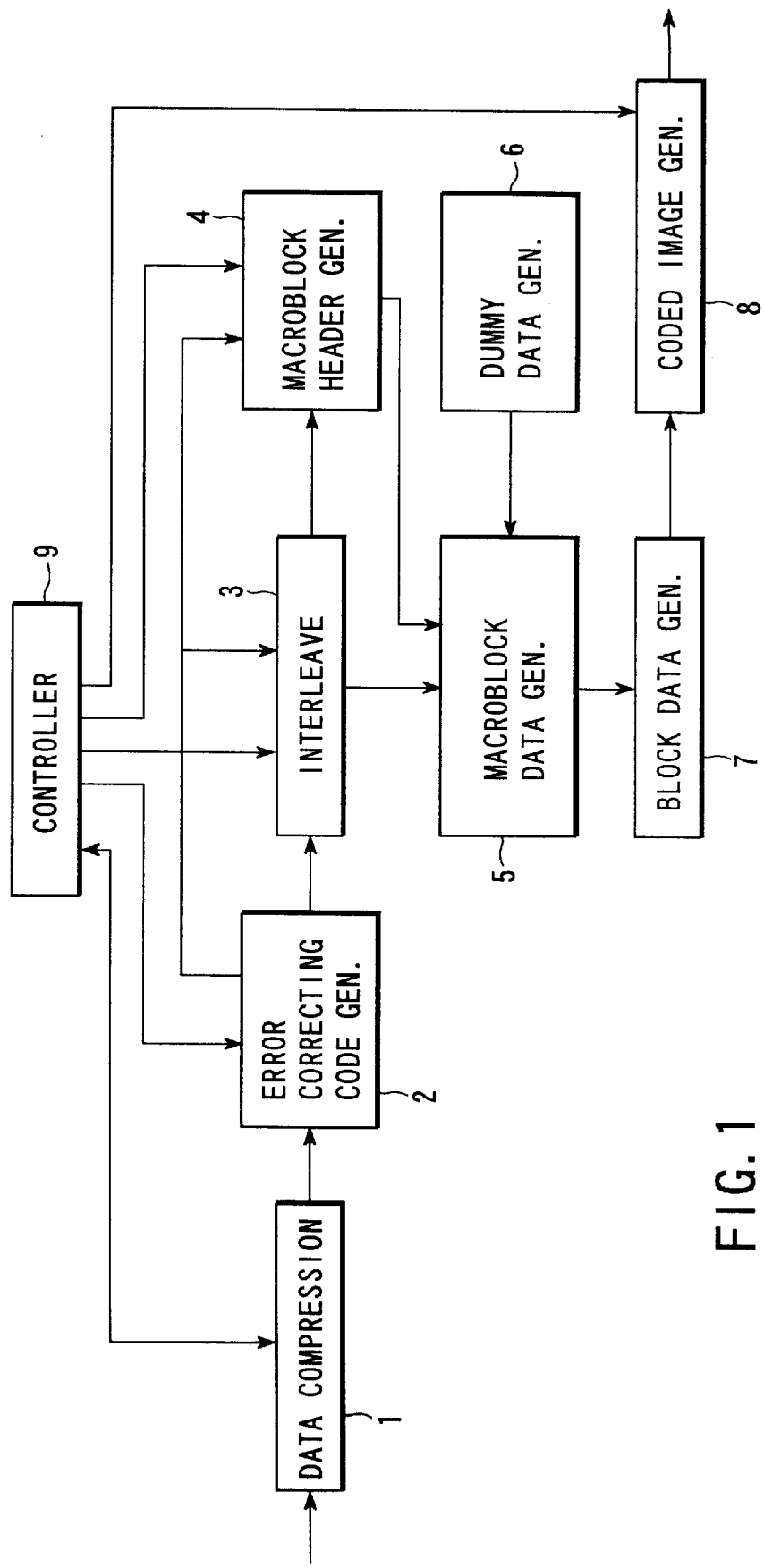
FIG. 1 is a block diagram of a first embodiment of the present invention.
Figure 3:
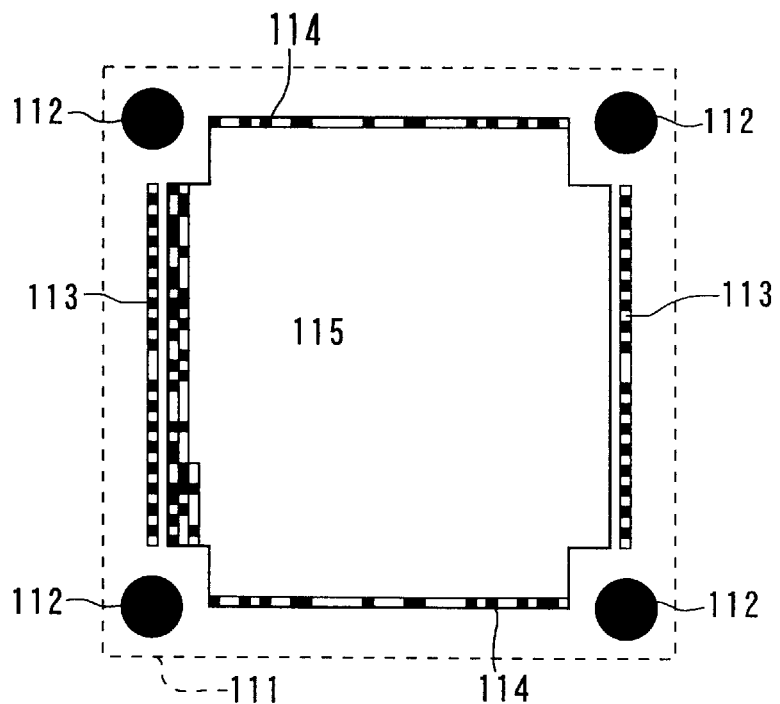
FIG. 3 illustrates a physical data format of each block comprising a coded image.

Referring now to FIG. 1, a coded image recording device according to a first embodiment of the present invention comprises a data compression unit 1 for compressing multimedia information containing sound, images, text and so on, an error correcting code generator 2 for appending correcting parity to the compressed data to generate error correcting codes, an interleave unit 3 for interleaving the error correcting codes, a macroblock header generator 4 for generating macroblock headers with correcting codes appended using the interleave length, the correcting code length, the parity length, macroblock concatenation information used in constructing a supermacroblock and the error correcting check parity generated by the data, a dummy data generator 6 for generating dummy data, a macroblock data generator 5 for generating a group of macroblock data from supermacroblock data after interleaving, the macroblock headers, and the dummy data, a block data generator 7 for diving the generated macroblock data group into a plurality of pieces of block user data and appending a block header to each block user data to generate a group of block data, a coded image generator 8 for generating a coded image from the generated block data group according to the type of code array, and a controller 8 for performing overall control on the operation of the reading device. In the description below, it is assumed that the multimedia information is sound data, the error correcting code is an RS (Read Solomon) code, and a dot code is one in which a plurality of blocks 111 are arranged in concatenated form each of which comprises markers 112, pattern codes 113, block headers 114, and block user data 115 as shown in FIG. 3. Of course, these are not restrictive.

The operation of the first embodiment will be described hereinafter with reference to FIGS. 1 through 6.

Figure 2:
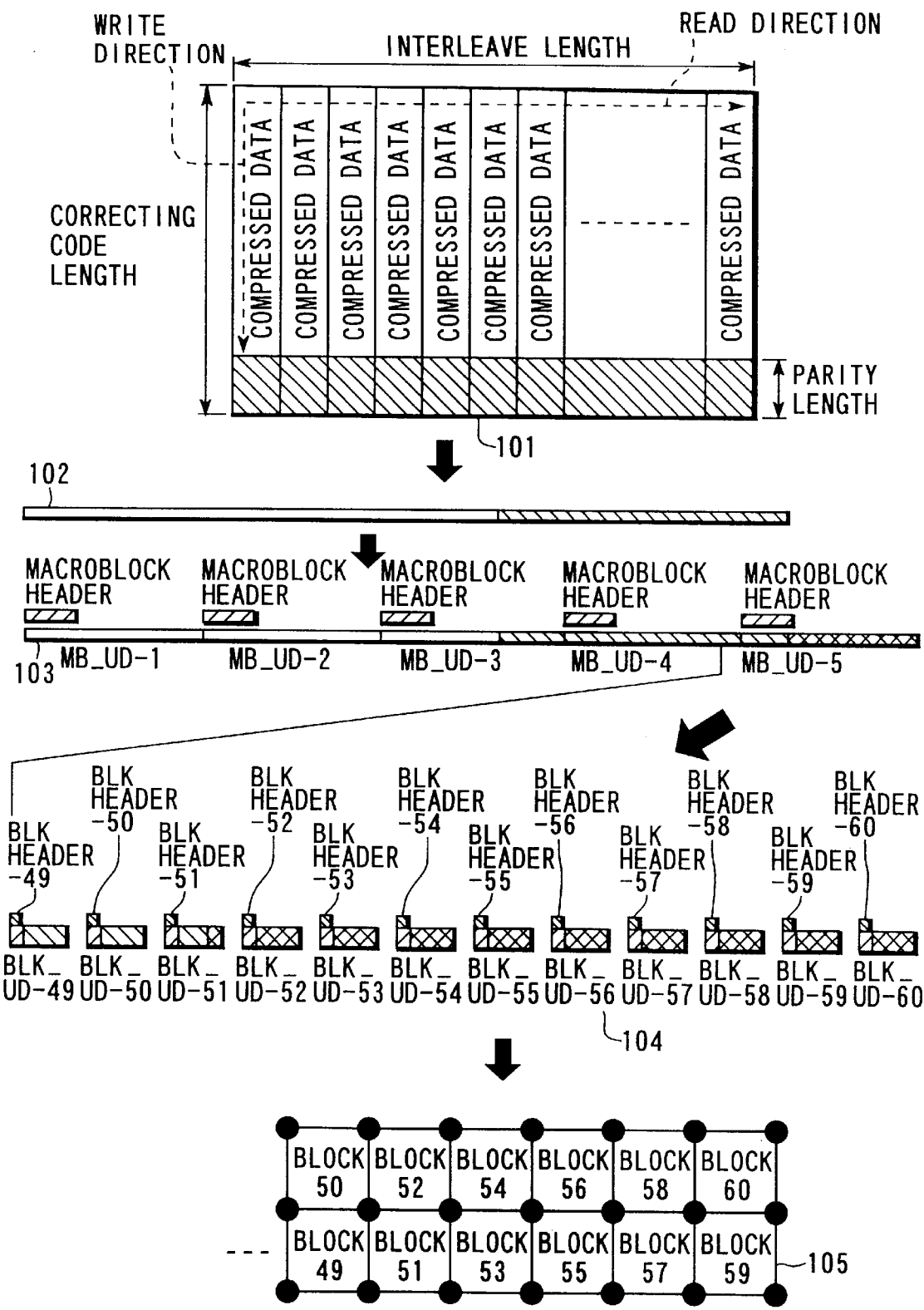
FIG. 2 illustrates transitions of a logical data format used in the first embodiment.
Figure 4:
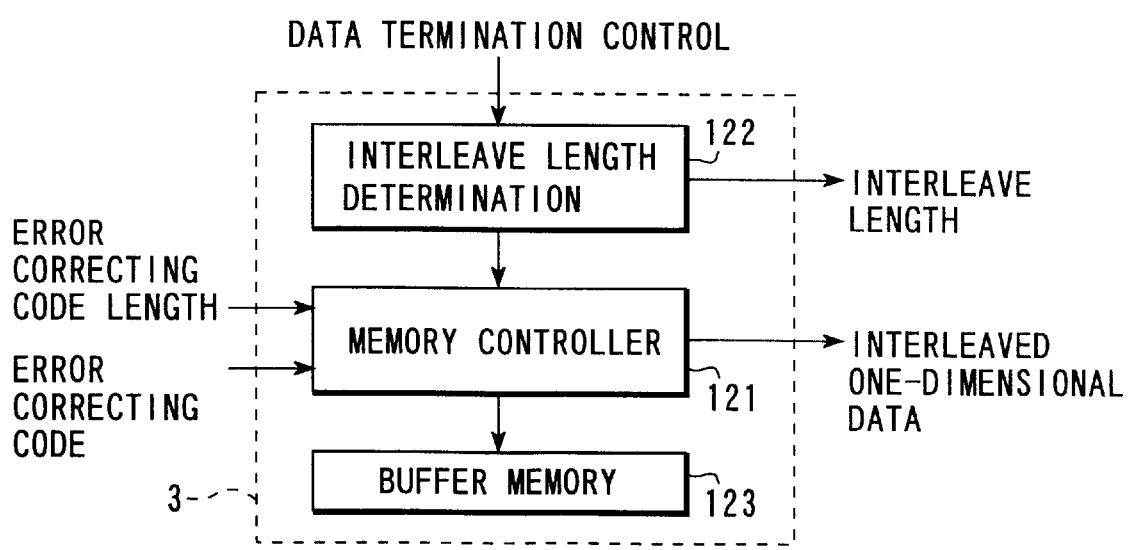
FIG. 4 is a block diagram of the interleave unit of FIG. 1.
Figure 5:
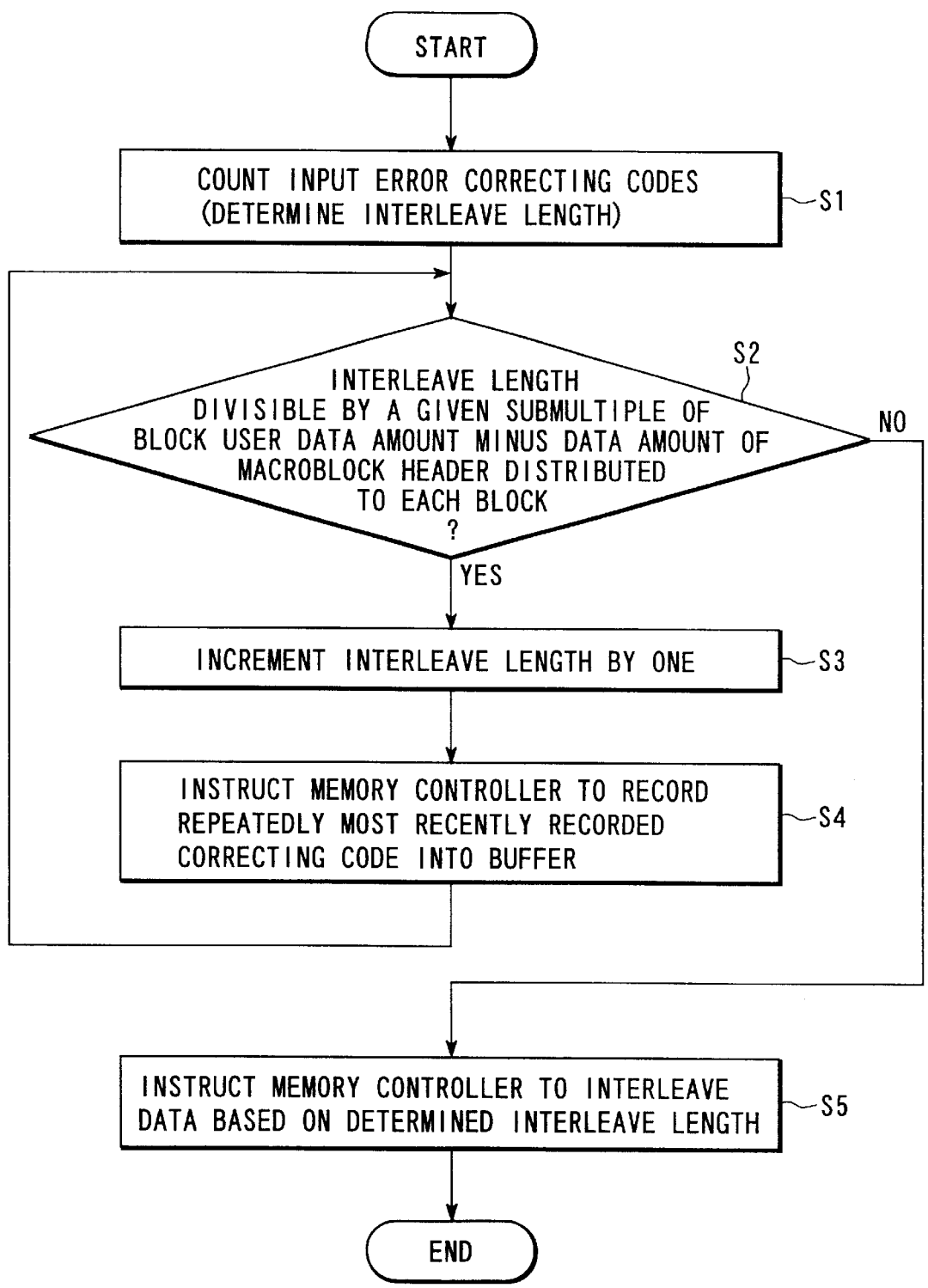
FIG. 5 is a flowchart for interleave processing of the present invention.
Figure 6:
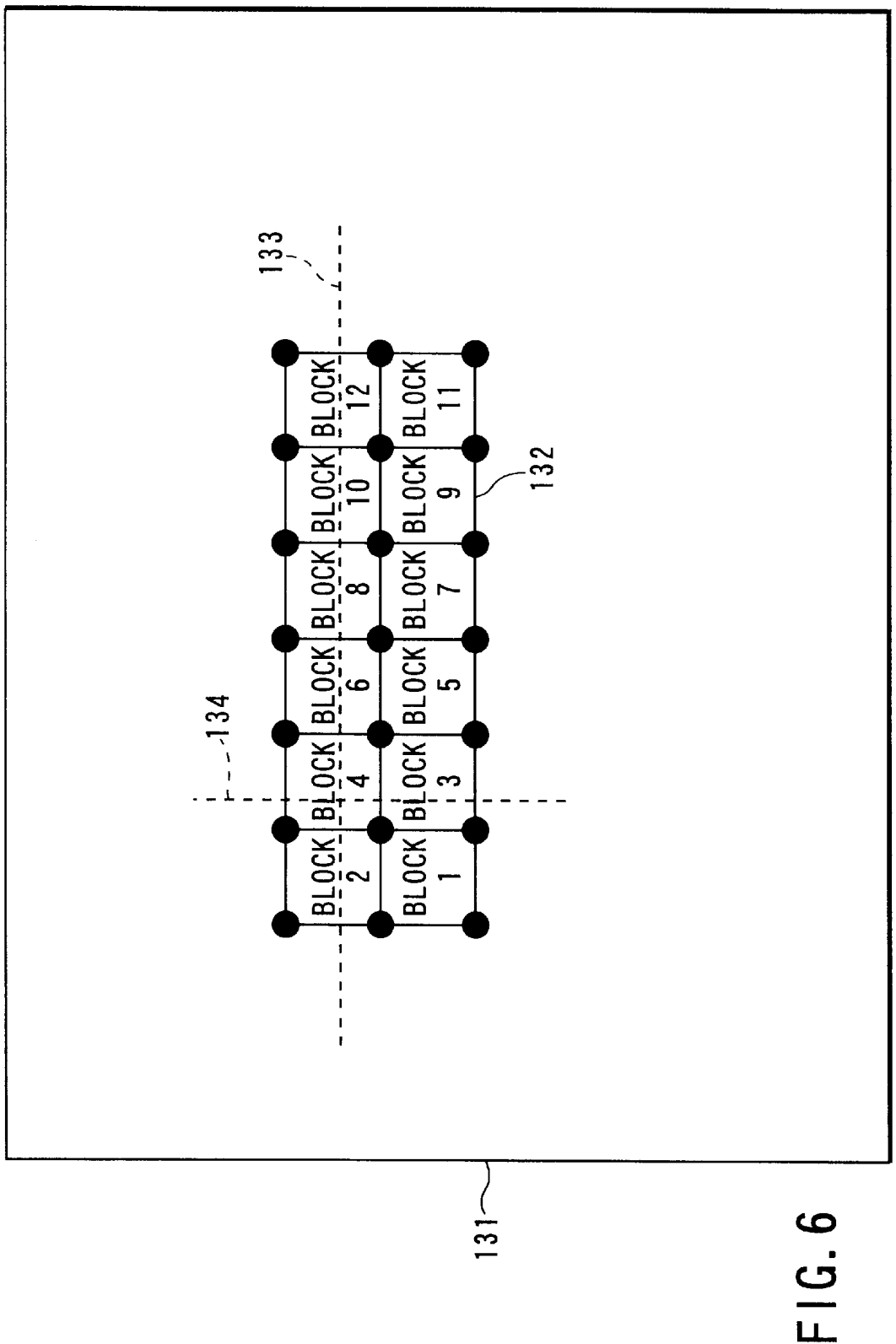
FIG. 6 illustrates scratches that occur when a coded image is printed on paper.

FIG. 2 illustrates transitions of a logical data format in the first embodiment, FIG. 3 illustrates a physical format of each block comprising a coded image, FIG. 4 illustrates an arrangement of the interleave unit 3, FIG. 5 is a flowchart for interleave processing, and FIG. 6 illustrates scratches that are produced when the coded image is recorded on paper.

Sound information from a sound input unit (not shown), such as a microphone, is converted by an analog-to-digital converter not shown into digital sound data. Since the sound entry and the analog-to-digital conversion are well known in the art, their illustration and description are omitted. The digital sound information is applied to the data compression unit 1 where it is subjected to analysis-synthesis coding such as CELP (code excited linear prediction) or waveform coding such as ADPCM (adaptive differential pulse code modulation) for compression so that coded data the amount of which is specified by the controller 9 is allocated for each frame having a predetermined period of, for example, 30 msec. The compressed data is stored in a buffer memory not shown in the data compression unit 1. A header that defines the compression scheme and the amount of data is appended to the beginning of the compressed data. The compressed data with the header appended is applied to the error correcting code generator 2. At the completion of outputting of all the compressed data with the header, an output completion signal is sent from the data compression unit 1 to the controller 9.

Upon receipt of the compressed data with the header appended, the error correcting code generator 2 appends error correcting and checking parity to each sequence of data quantity of which corresponds to correcting capability specified by the controller 9, thus producing a correcting code. For example, for every three frames each of 24 bytes, a (88, 72) RS code is generated with 16 bytes of checking parity appended. The correcting code thus generated, and its code length and parity length are provided to the interleave unit 3 and the macroblock header generator 4.

The correcting code is stored in a buffer memory 123 in the interleave unit 3 via a memory controller 121 as shown in FIG. 4. The memory controller informs an interleave length determination unit 122 of the reception of each correcting code. The interleave length determination unit counts the number of correcting codes that have been written into the buffer memory by the memory controller until a data completion signal is output from the controller 9.

Here, the processing by the interleave unit 3 will be described with reference to a flowchart of FIG. 5. In the interleave processing, the number of error correcting codes is first counted (step S1). The total count of the error correcting codes corresponds to the interleave length. A decision is then made in step S2 as to whether or not the interleave length is divisible by a given submultiple of (the amount of the block user data quantity)–(the amount of macroblock header data quantity distributed to each block defined).

If the interleave length is divisible, then the interleave length is incremented by one (step S3). The memory controller 121 is instructed to record repeatedly the most recently stored correcting code into the buffer memory 123 (step S4) and then the procedure returns to step S2. The correcting code repeatedly recorded is not limited to the most recently stored correcting code. It may be an optional correcting code which can be corrected.

On the other hand, if, in step S2, the interleave length is not divisible by the given submultiple, then an instruction is given to the memory controller 121 to perform interleaving based on an interleave length determined (step S5).

Here, assuming that a macroblock is comprised of 12 blocks and the macroblock header comprises 24 bytes, the amount of macroblock header data distributed to each block is two bytes.

As described previously, in order not to allow data bytes forming one correcting code to be placed in the same offset location in each block user data to be described later, it is required that the interleave length be not divisible by a given submultiple of (the amount of the block user data quantity)–(the amount of macroblock header data quantity distributed to each block defined). By satisfying such a requirement, it becomes possible to minimize the effect of errors due to linear scratches produced in the horizontal and vertical directions on the code 105.

Reference will be made next to FIG. 2 to describe transitions of the logical data format.

The memory controller 121 reads the logically two-dimensional supermacroblock data 101 defined by the interleave length determined by the above processing in the direction of interleave to thereby produce one-dimensional supermacroblock data 102, which is in turn applied to the macroblock data generator 5.

The macroblock header generator 4 generates a macroblock header, which comprises the interleave length sent from the interleave unit 3, the error correcting code length and the parity length sent from the error correcting code generator 2, the address number of the starting block in the code 105, the number of macroblocks constituting the supermacroblock calculated from the interleave length, the correcting code length, and the data size of macroblock user data (MB_UD), and error correcting/checking parity. The macroblock headers are output to the macroblock data generator 5.

The macroblock data generator 5 generates a group of macroblock data 103 from the input macroblock header and one-dimensional supermacroblock data 102. The macroblock data group 103 comprises macroblock user data (MB_UD-1, 2, 3, 4, 5) and the macroblock header. The macroblock header is the same for all the macroblock user data. Each macroblock user data is obtained by dividing the one-dimensional supermacroblock data by a predetermined amount of data.

If the last macroblock user data is less than the predetermined amount of data, it is padded with dummy data generated from the dummy data generator 6 so that all the macroblock user data will be of the same size. In the macroblock data group 103, the latter-half part of MB_UD-5 shown in cross-hatching indicates the dummy data padded to make the MB_UD-5 equal in size to the other macroblock user data.

The macroblock data group 103 thus generated is output to the block data generator 7, which split each macroblock data into much smaller blocks of data to obtain a group of block data 104. The method of splitting will be described below.

First, the macroblock header is divided by the number of blocks constituting the macroblock to obtain block headers. Each block header is placed at the beginning of corresponding block user data. For example, assume that the macroblock header is 24 bytes and the number of blocks in each macroblock is 12.

Then, two bytes of block header are allocated to each block. Next, the macroblock user data is divided by the number of blocks in each macroblock to obtain a plurality of blocks of data. In the above description, each block header is placed at the beginning of the corresponding block user data; however, this is not restrictive. The block header may be placed in a different position for each block.

The block data group 104 thus produced is output to the coded image generator 8, which converts each block data in the input block data group 104 into the block 111 shown in FIG. 3 and concatenates the resulting blocks according to a code array specified by the controller 9 to produce a code 105. In the conversion from the block data to the block 111, markers 112 and pattern codes 113 are stored in predetermined locations in a bit-mapped image, and black and white dots corresponding to the respective bits of the block header are stored in block headers 114. Further, the user data in the block data is subjected to recording modulation and then stored in block user data 115 in the form of black and white dots corresponding to the respective bits in the resulting recording modulated code. In this example, the code 105 thus produced is delivered to a printer not shown and then printed on a recording medium such as paper.

As described so far, the coded image recording device according to the first embodiment determines the interleave length such that the byte data in the correcting codes are not arranged in lines in the horizontal and vertical directions in the code, not by making the supermacroblock data size an integral multiple of the macroblock user data size as in the conventional technique. Thus, as in the conventional technique, a data structure can be used which allows control information, including correcting capability and optional interleave length, to be stored in a very small amount in comparison with the data amount of multimedia information to be recorded and moreover the reproducing device to acquire the control information with certainty. For this reason, a code can be produced easily that has error resistance to linear scratches in the horizontal and vertical directions in the code.

In the first embodiment, in most cases, the supermacroblock data size which is structured by optional interleave length is not an integral multiple of the macroblock data size. In order to make the structures of data under supermacroblock data identical to the conventional ones, it is required only to insert dummy data into a macroblock user data area that is not filled with supermacroblock data.

A second embodiment of the present invention will be described next.

Figure 7:
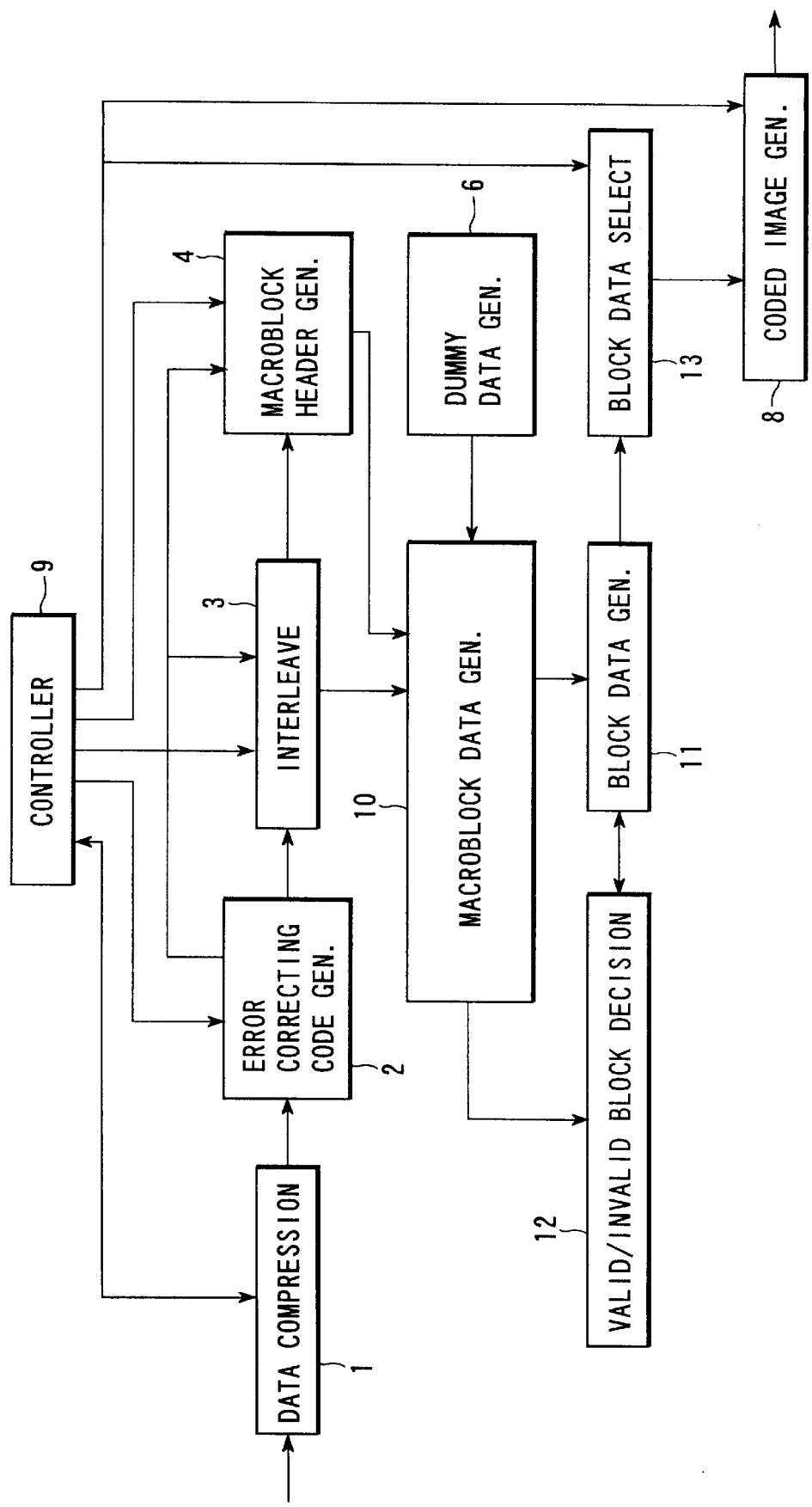
FIG. 7 is a block diagram of a second embodiment of the present invention.

FIG. 7 illustrates, in block diagram form, an arrangement of a coded image recording device according to the second embodiment. The device comprises a data compression unit 1 for compressing multimedia information such as sound, images, text, and so on, an error correcting code generator 2 for adding correcting parity to the compressed data to generate error correcting codes, an interleave unit 3 for interleaving the error correcting codes, a macroblock header generator 4 for generating a macroblock header comprising the interleave length, error correcting code length, parity length, starting block address, and correcting parity and the error correcting check parity generated by the data, a macroblock data generator 10 for generating a group of macroblock data from one-dimensional supermacroblock data and the macroblock header, a block data generator 11 for generating a group of block data from the macroblock data, a valid/invalid block decision unit 12 for making a decision as to whether each block data is valid or invalid, a block data selector 13 for selecting block data which have been subjected to valid/invalid decision which are to be drawn in a coded image according to a code array, a coded image generator 8 for drawing selected block data in the coded image, and a controller 9 for controlling the overall operation of the device.

In the description below, it is assumed that the multimedia information is sound data, the error correcting code is an RS code, and a dot code is one in which a plurality of blocks 111 are arranged in concatenated form each of which comprises markers 112, pattern codes 113, block headers 114, and block user data 115 as shown in FIG. 3. Of course, these are not restrictive. The arrangement of FIG. 7 is distinct from that of FIG. 1 in that the valid/invalid block decision unit 12 and the block data selector 13 are added.

Hereinafter the operation of the coded image recording device according to the second embodiment will be described with reference to FIGS. 2, 3, 7, 8, and 9.

Sound information input from a microphone not shown is converted into digital sound information. In the data compression unit 1, the digital sound information is compressed by means of analysis-synthesis coding such as CELP or waveform coding such as ADPCM in units of a frame having a period of 30 msec by way of example so that each frame contains an amount of coded data specified by the controller 9. The processes from the compression to the interleaving of correcting codes by the interleave unit 3 and the generation of a macroblock header by the macroblock header generator 4 remain unchanged from those in the first embodiment. Thus, their detailed description is omitted here.

As in the first embodiment, the macroblock data generator 10 generates the macroblock data group 103 from the input one-dimensional supermacroblock data 102, the dummy data, and the macroblock header. Here, the second embodiment is distinct from the first embodiment in that the data quantity of the one-dimensional supermacroblock data 102 is presented to the valid/invalid block decision unit 13.

The block data generator 11 divides each macroblock data in the macroblock data group 103 into a group of smaller blocks of data 104. This method remains unchanged from that in the first embodiment and the description thereof is therefore omitted.

Each block data thus generated is sent to the valid/invalid block decision unit 12, which, using the data quantity of the input one-dimensional supermacroblock data 102 sent from the macroblock data generator 10, decides whether the supermacroblock data is contained in data other than the macroblock header in the user data of block data. When it is decided that all the data other than the macroblock header in the user data of the block data is dummy data, that block data is considered as invalid. On the other hand, block data that contains some (e.g., no more than one byte) of supermacroblock data in addition to dummy data is decided to be valid. The result of decision is presented to the block data generator 11 where it is written into the corresponding block header.

Figure 8:
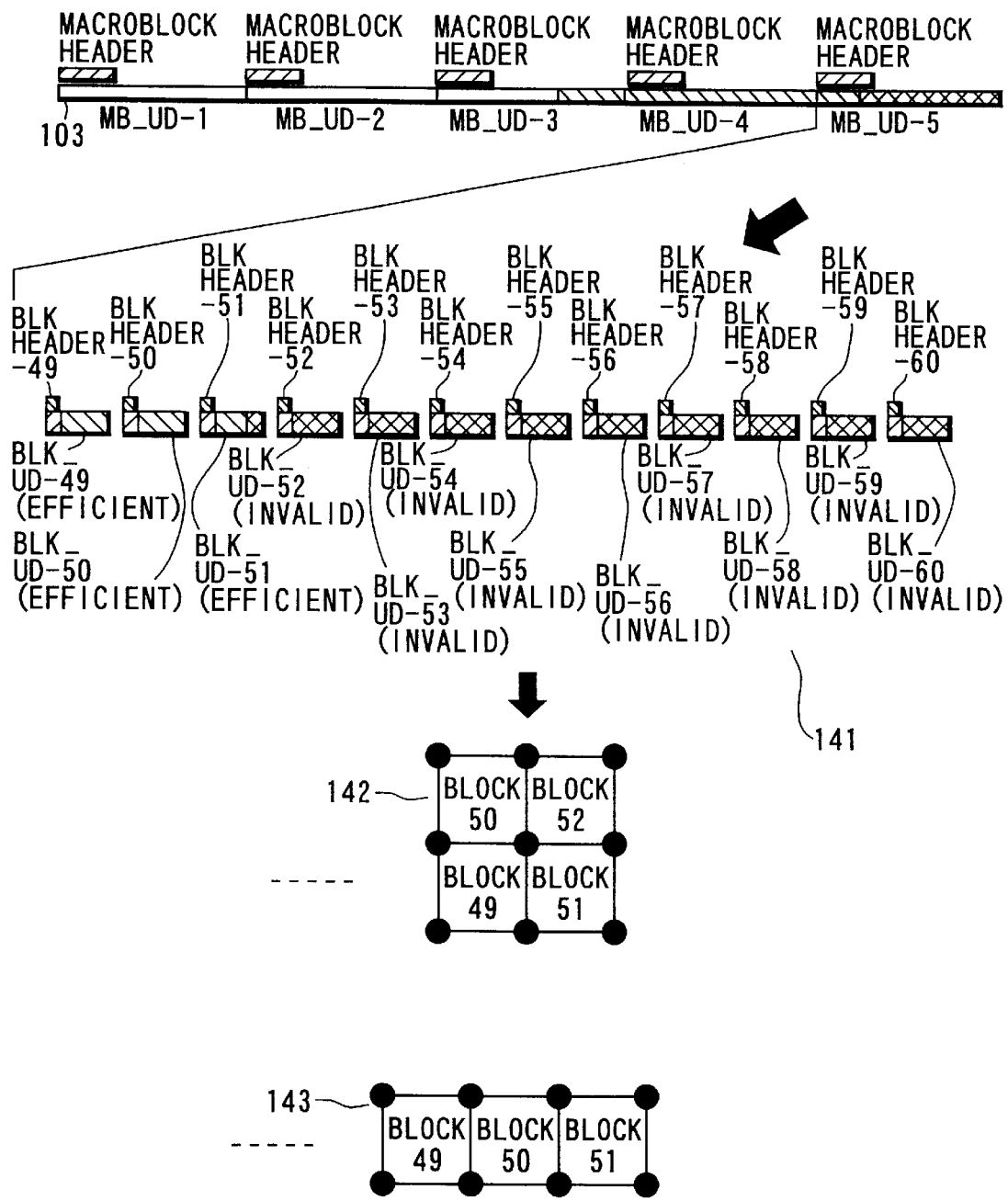
FIG. 8 illustrates transitions of a logical data format when the supermacroblock is one in number in the second embodiment.

In the block data group 141 of FIG. 8, there is shown valid/invalid decision information for each block data. The block data selector 13 selects block data to be drawn in response to a code array control signal from the controller 9.

FIG. 8 shows two types of code array patterns: code array-1 (142) and code array-2 (143). The rules for selecting block data used in the block data selector 13 are as follows:

In the first place, valid blocks are selected without fail. Second, a minimum number of invalid blocks is selected if valid blocks alone are insufficient to form a rectangular code array. In the code array-1 (142) of FIG. 8, the block 52 is a sample. Since three valid blocks 49, 50 and 51 alone cannot form a rectangular array, the block 52 is selected. Third, when the macroblock data is one in number, all the invalid blocks are selected.

Invalid blocks that do not satisfy the above conditions are not imaged as a coded image. That is, in the conventional technique and the first embodiment, the blocks through block 60 are imaged, whereas, in the code array-1 (142), only the blocks through block 52 are imaged and, in the code array-2 (143), only the blocks through block 51 are imaged. Thus, the second embodiment allows for shorter code length.

The significant data that non-imaged blocks hold is the distributed macroblock header. The same macroblock header is allocated for all the macroblock data. Thus, even if the macroblock header allocated for the last macroblock data is imperfect, there is no problem because the reading device has only to reproduce at least one of the macroblock headers allocated for the other macroblock data. On the other hand, if the macroblock data is one in number, which means that the macroblock header is also one in number, the perfect macroblock header cannot be reproduced on the reproduction side unless all the invalid blocks are selected. This is the reason for the third rule.

The block data selected by the block data selector 13 are concatenated in the form of the block 111 shown in FIG. 3 in the coded image generator 8 according to the code array specified by the controller 9. The block data-to-block conversion is made in the same way as with the first embodiment. The information concerning valid/invalid blocks recorded in the block header is not needed on the reproduction side; thus, nothing about that information is recorded on the coded image.

Figure 9:
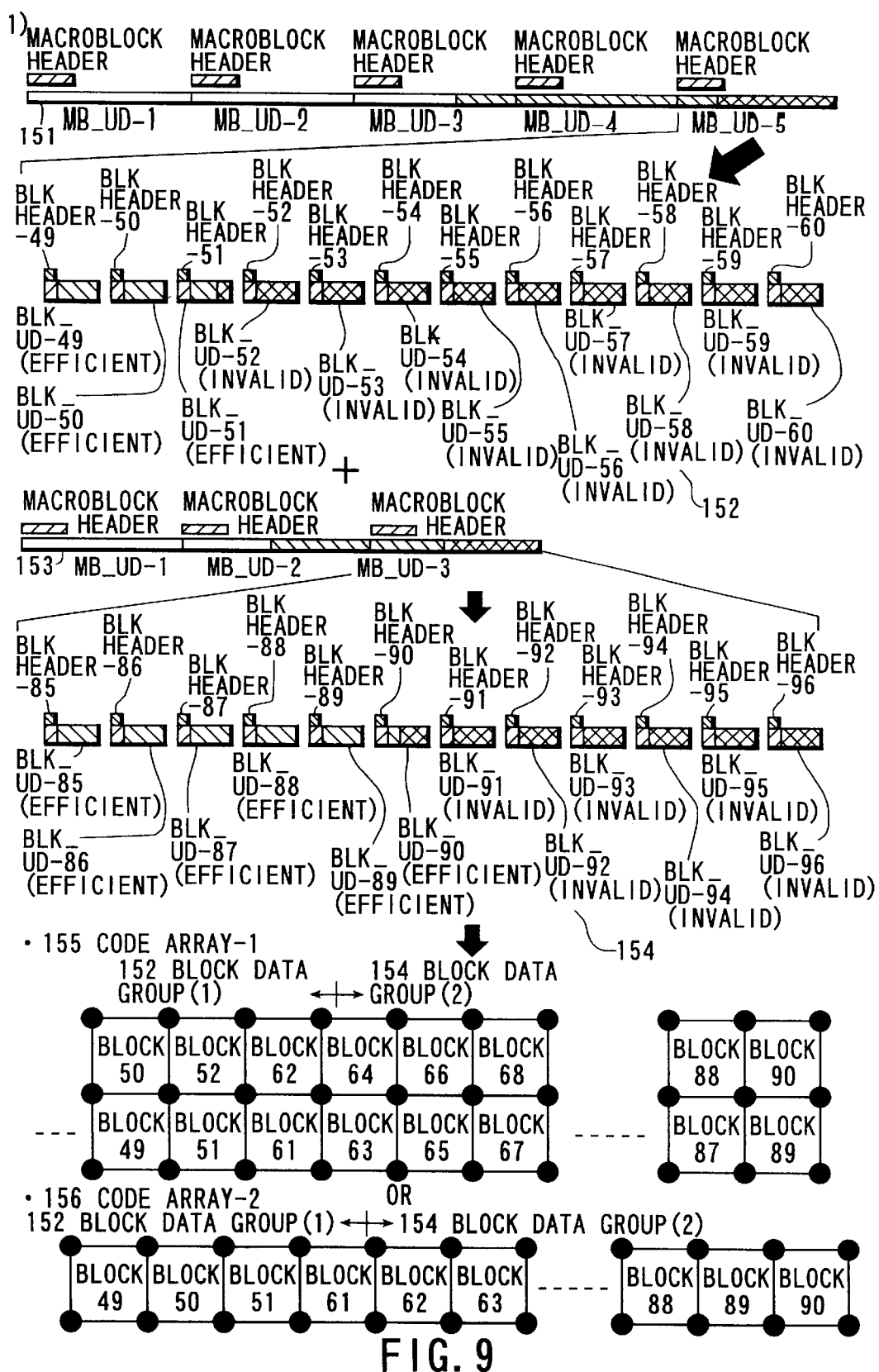
FIG. 9 illustrates transitions of a logical data format when there is multiple supermacroblocks in the second embodiment.

FIG. 9 shows an example of recording two pieces of supermacroblock data in a code. A macroblock data group (1) 152 produced from first supermacroblock data and a macroblock data group (2) 154 produced from second supermacroblock data are divided into block data groups (1) 152 and block data groups (2) 154, respectively. An valid/invalid decision is made for each block data. Each block data is assigned a unique block address.

Block data to be imaged are selected from the block data groups (1) 152 and the block data groups (2) 154 as shown in code array-1 (155) and code array-2 (156). The block addresses of block data that are not imaged are missing in the code arrays.

The starting block address described in the macroblock header, when there are more than one piece of supermacroblock data to be recorded, represents the starting block address of block data produced from each supermacroblock data. Therefore, the starting block address in the macroblock header assigned to the macroblock data group (1) 151 is 1, while the starting block address in the macroblock header assigned to the macroblock data group (2) 153 is 61. Thus, the reproduction side can easily recognize the starting position for reconstructing each supermacroblock data.

As described so far, according to the coded image recording device of the second embodiment, as in the conventional technique, a data structure can be used which allows control information, including correcting capability and interleave length, to be stored in as small an amount as possible in comparison with the data amount of multimedia information to be recorded and moreover the reproducing device to acquire the control information with certainty. Error resistance to linear scratches in the horizontal and vertical directions can be increased. There is no need of imaging useless dummy data as a coded image and a minimum code size can be obtained, providing greater freedom in layout on paper.

A third embodiment of the present invention will be described next.

Figure 10:
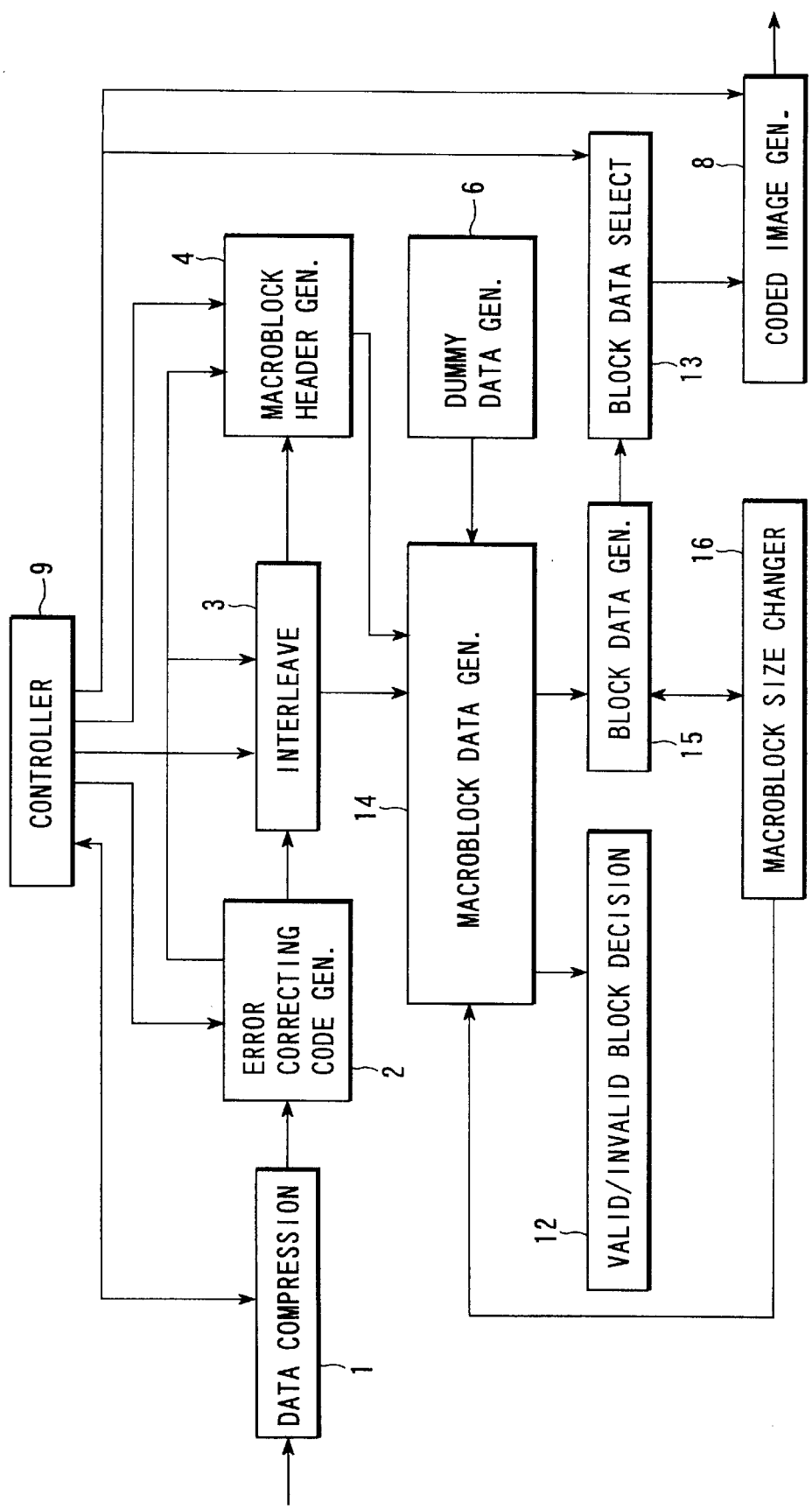
FIG. 10 is a block diagram of a third embodiment of the present invention.

FIG. 10 illustrates, in block diagram form, an arrangement of a coded image recording device according to the third embodiment. The device comprises a data compression unit 1 for compressing multimedia information such as sound, images, text, and so on, an error correcting code generator 2 for adding correcting parity to the compressed data to generate error correcting codes, an interleave unit 3 for interleaving the error correcting codes, a macroblock header generator 4 for generating a macroblock header comprising the interleave length, error correcting code length, parity length, starting block address, and the error correcting check parity generated by the data, a macroblock data generator 14 for generating a group of macroblock data from one-dimensional supermacroblock data and the macroblock header, a block data generator 15 for generating a group of block data from the group of macroblock data, a valid/invalid block decision unit 12 for making a decision as to whether each block data is valid or invalid, a macroblock size changing unit 16 for changing the macroblock size through a comparison between the number of macroblocks and the number of valid blocks and informing the macroblock data generator 14 and the block data generator 15 of the changed macroblock size, a block data selector 13 for selecting block data which have been subjected to valid/invalid decision which are to be drawn in a coded image according to a code array, a coded image generator 8 for drawing selected block data in the coded image, and a controller 9 for controlling the overall operation of the device.

In the description below, it is assumed that the multimedia information is sound data, the error correcting code is an RS code, and a dot code is one in which a plurality of blocks 111 are arranged in concatenated form each of which comprises markers 112, pattern codes 113, block headers 114, and block user data 115 as shown in FIG. 3. Of course, these are not restrictive. The third embodiment is distinct in arrangement from the second embodiment in that the macroblock size changing unit 16 is added.

Hereinafter, the operation of the third embodiment will be described with reference to FIGS. 10 though 14.

Figure 11:
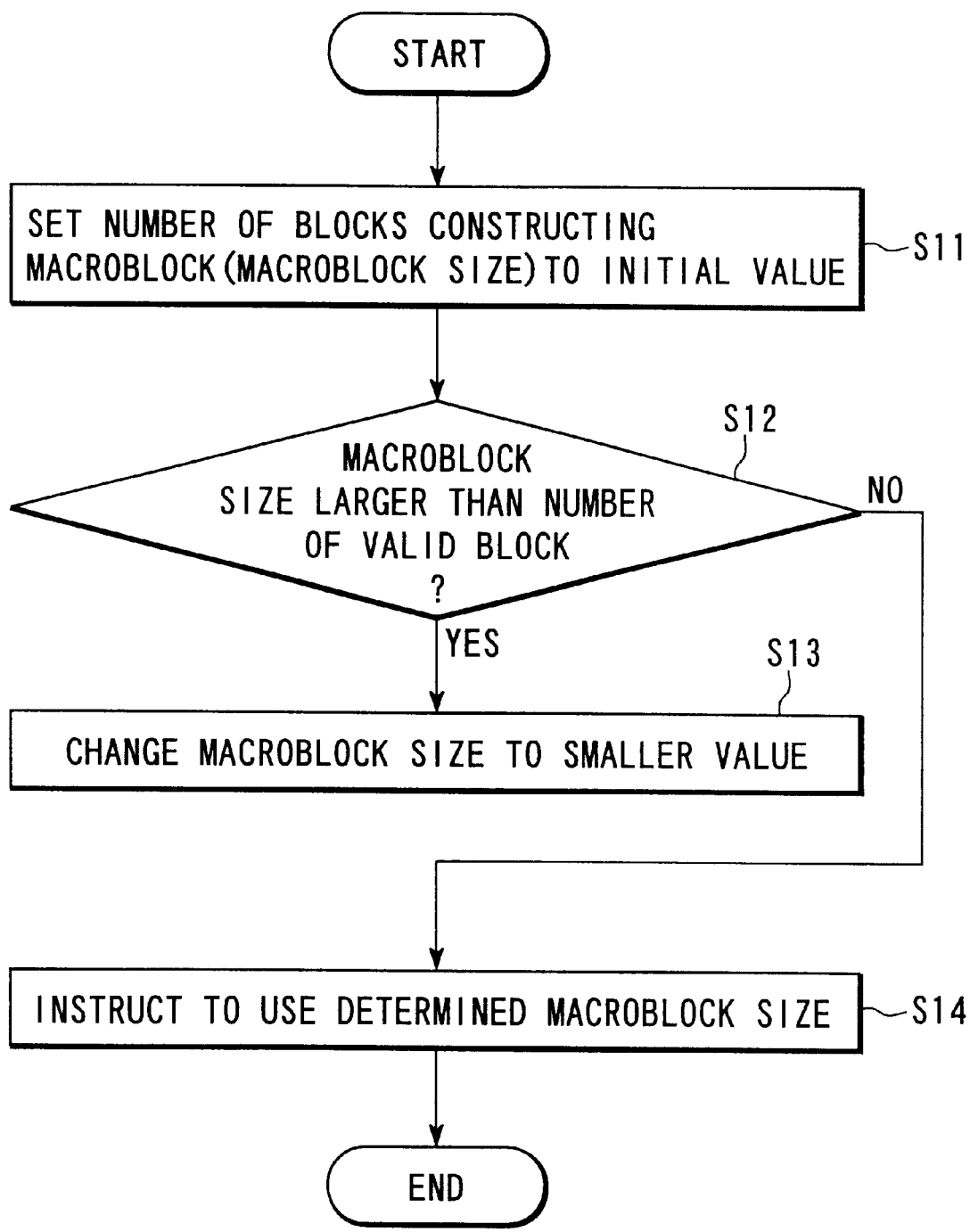
FIG. 11 is a flowchart for processing of changing the macroblock size in the third embodiment.
Figure 12:
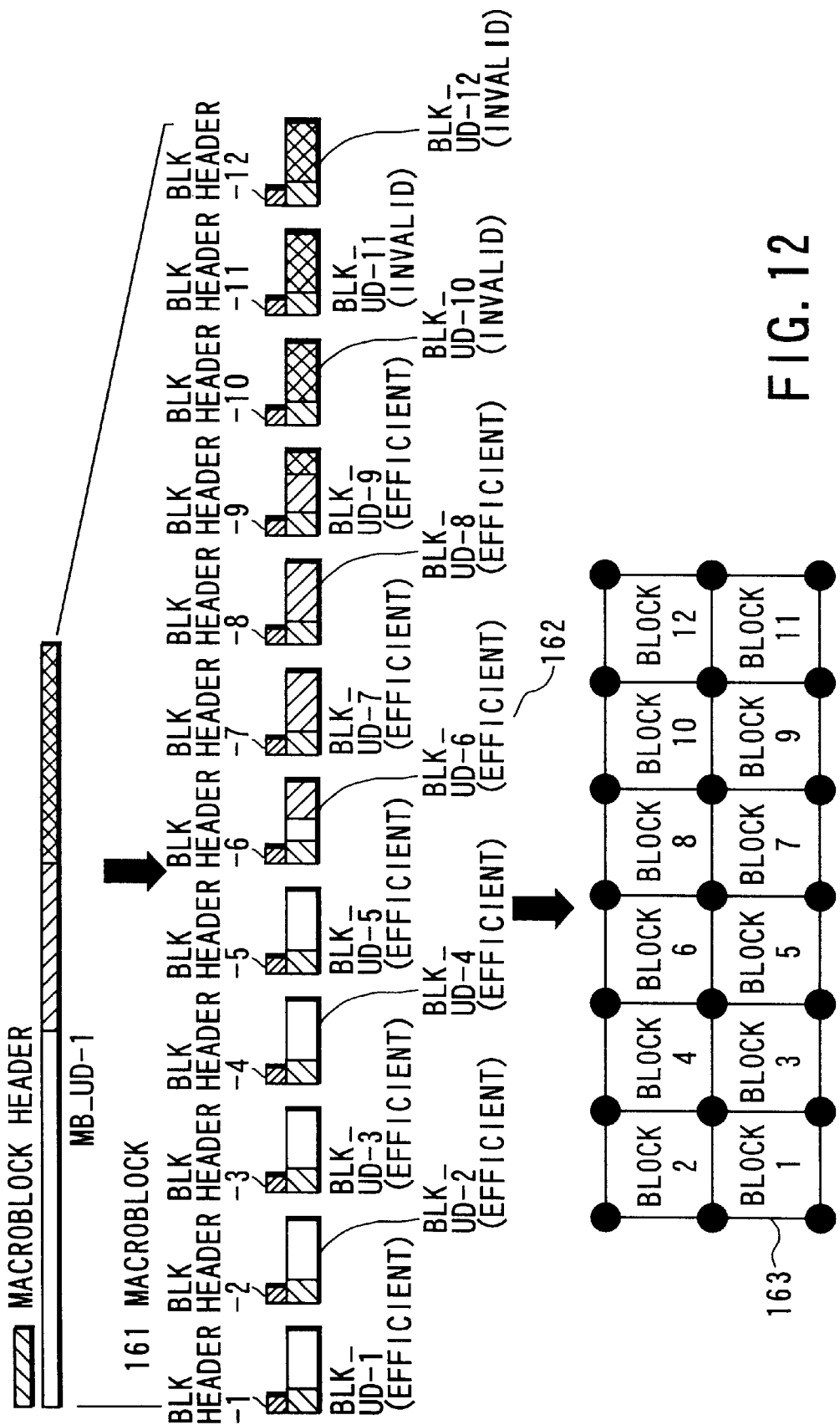
FIG. 12 illustrates transitions of a logical data format used in the second embodiment.
Figure 13:
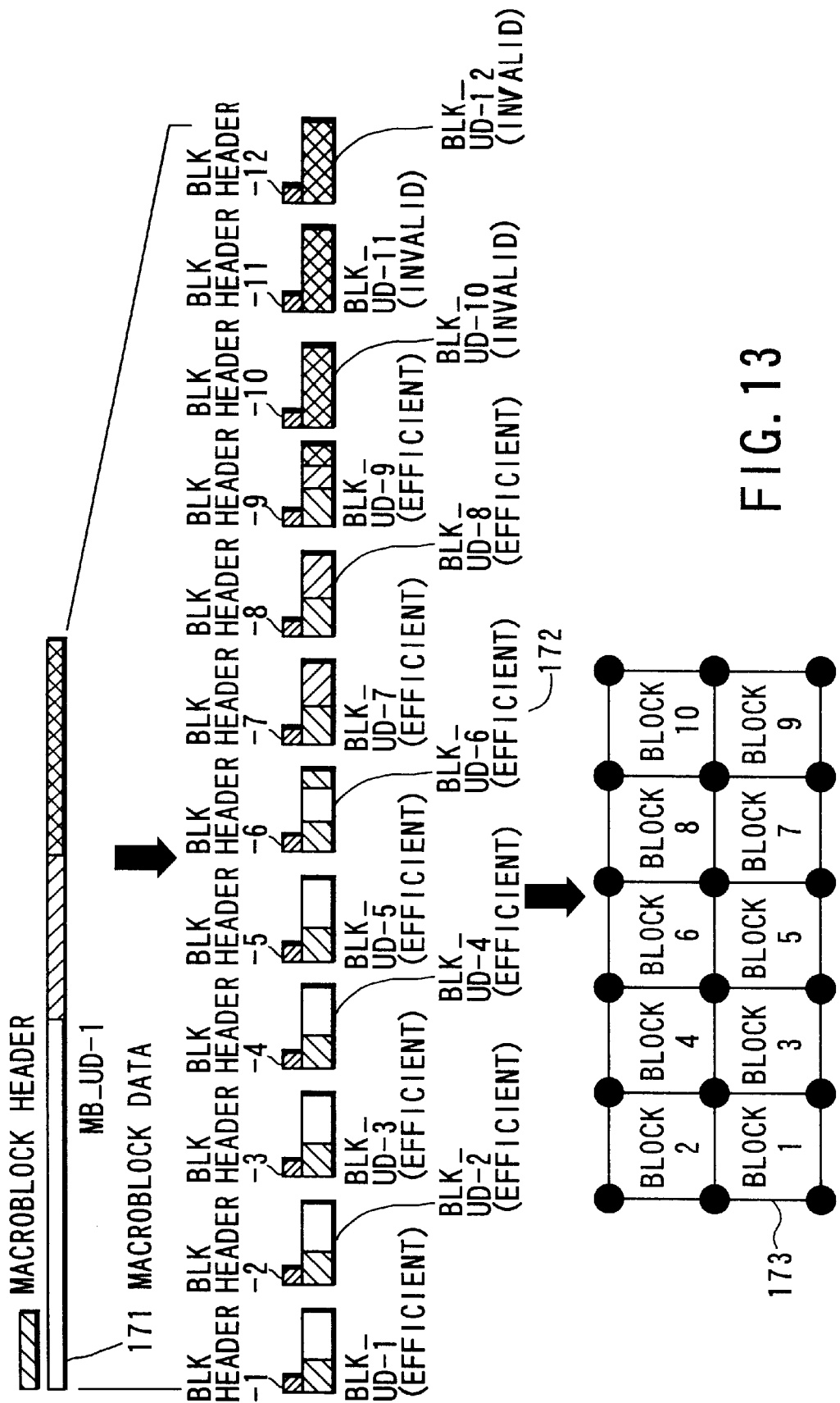
FIG. 13 illustrates transitions of a first logical data format used in the third embodiment.
Figure 14:
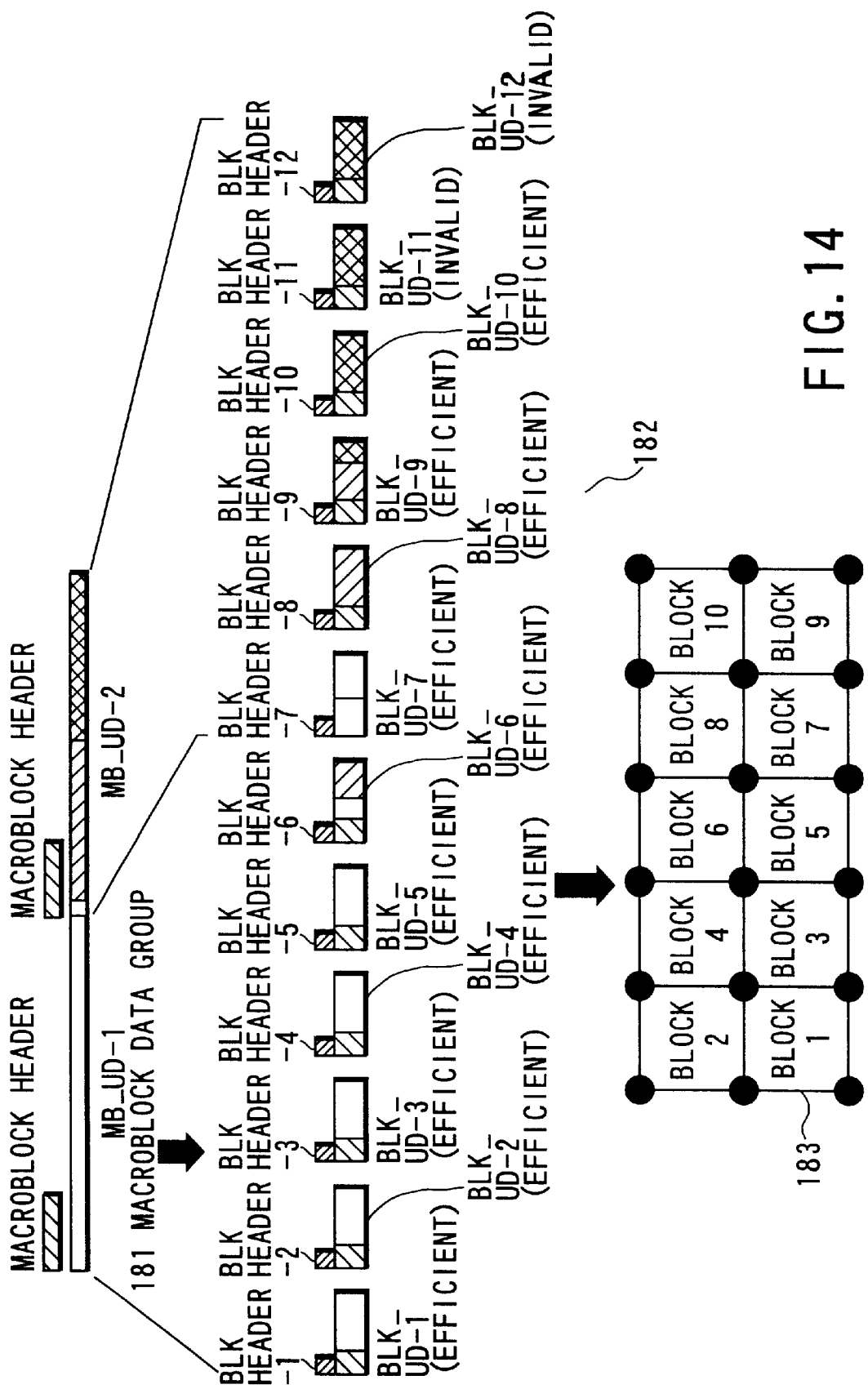
FIG. 14 illustrates transitions of a second logical data format used in the third embodiment.
Figure 15:
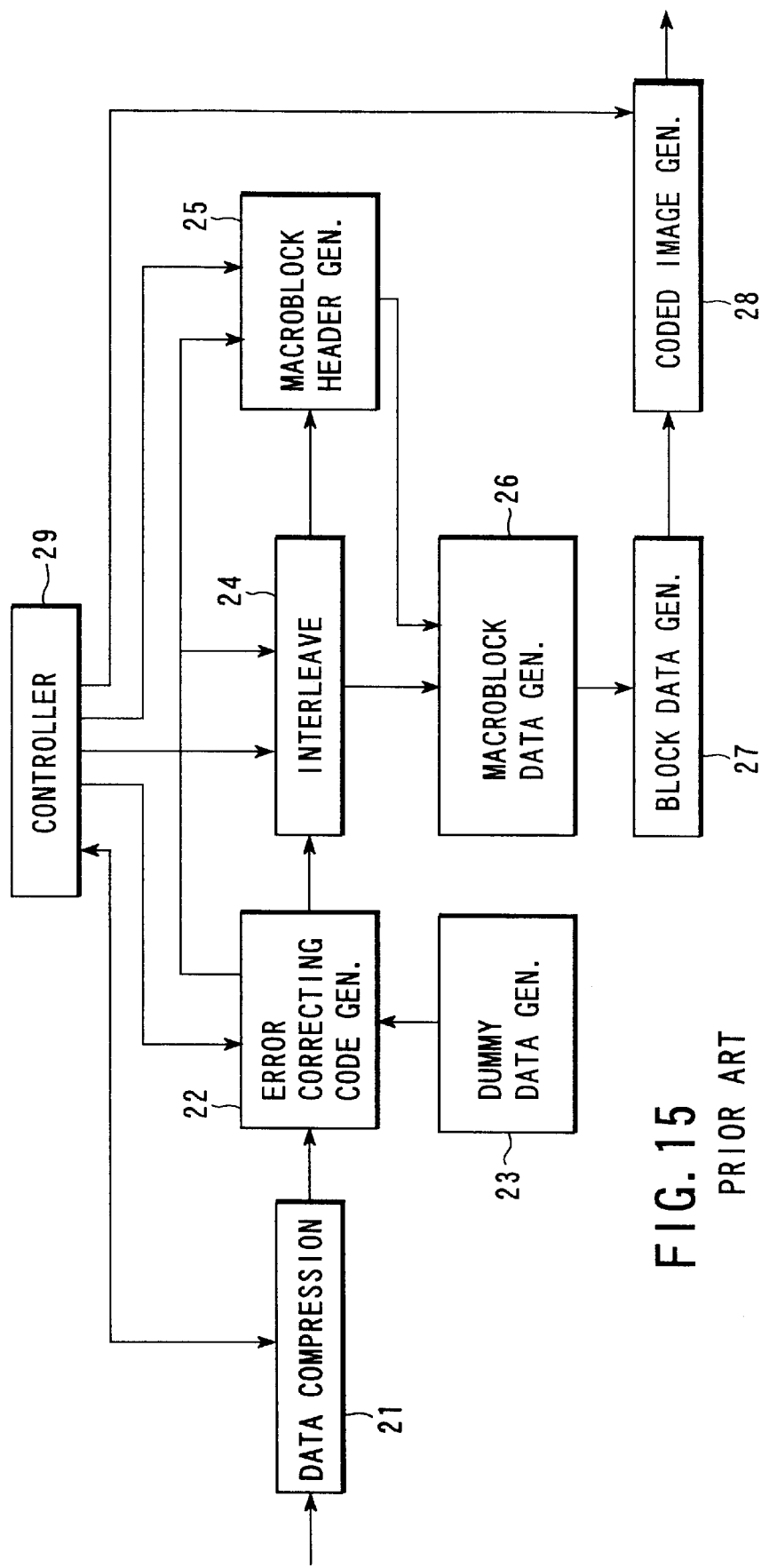
FIG. 15 is a block diagram of a prior art technique.
Figure 16:
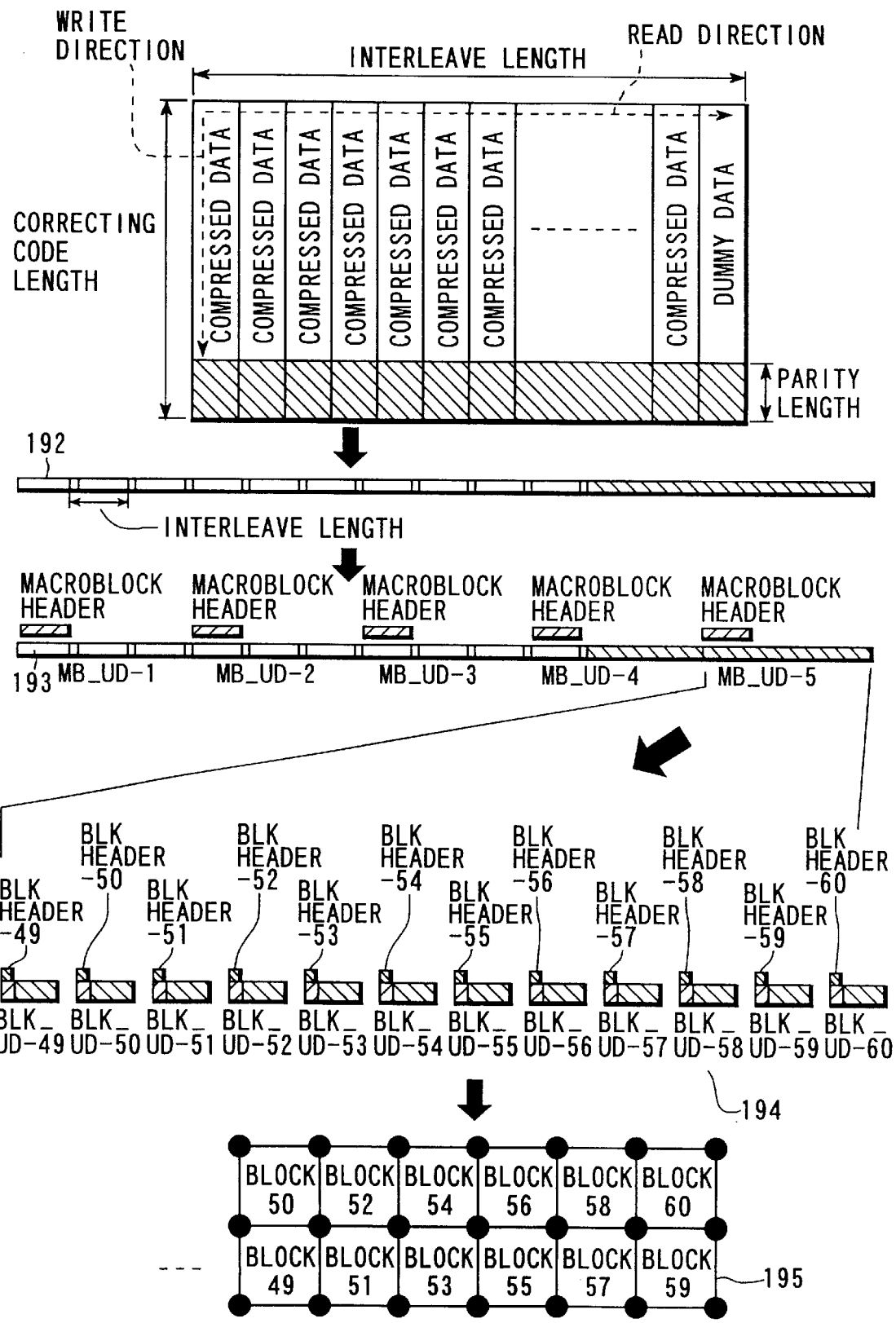
FIG. 16 illustrates transitions of a logical data format in the prior art technique.

FIG. 11 is a flowchart for macroblock size changing processing, FIG. 12 shows transitions of the logical data format, FIG. 13 shows transitions of a first logical data format, and FIG. 14 shows transitions of a second logical data format.

Sound information input from a microphone not shown is converted into digital sound information. In the data compression unit 1, the digital sound information is compressed by means of analysis-synthesis coding, such as CELP, or waveform coding, such as ADPCM, in units of a frame having a period of 30 msec by way of example so that each frame contains an amount of coded data specified by the controller 9. The processes from the process of compression to the process of interleaving correcting codes by the interleave unit 3 and generating a macroblock header by the macroblock header generator 4 and the process of selecting block data to be dot-coded by the block data selector 13 and imaging the code by the coded image generator 8 remain unchanged from those in the second embodiment.

In the macroblock data generator 14, the input one-dimensional supermacroblock data is divided into pieces of macroblock data as in the first and second embodiments. At this point, each macroblock data is made up of a given number of pieces of block data. For example, each macroblock data is comprised of 12 pieces of block data. In the block data generator 15, each macroblock data is divided into pieces of block data in the same way as in the first and second embodiments.

As in the second embodiment, in the valid/invalid block decision unit 12 a valid/invalid decision is made for each block data.

When, as shown in FIG. 12, generated macroblock data 161 is one in number, the block data selector 13 will not be able to discard invalid blocks as described in connection with the second embodiment. A problem still remains in that the minimum size of a coded image that can be produced is fixed at the macroblock data size.

As shown in FIG. 12, when coded-imaging a small amount of sound data, the macroblock size changer 16 reduces the number of blocks in the macroblock and requests the macroblock data generator 14 and the block data generator 15 to reproduce block data accordingly. The macroblock data generator 14 then divides one-dimensional supermacroblock data again into pieces of macroblock data smaller in size than predetermined. The resulting macroblock data is divided by the block data generator 15 as block data. The valid/invalid block decision unit 12 makes a valid/invalid decision for each block data and records the result of decision in the corresponding block header.

FIG. 14 shows the case where the one-dimensional supermacroblock data shown in FIG. 12 is divided into two pieces of macroblock data each of which is comprised of six pieces of block data. In this case, since two macroblock headers are present, blocks 11 and 12, which are invalid, can be removed in the light of the same rules for selecting blocks as in the second embodiment. The final code 183 can therefore be made smaller than the code 163 in FIG. 12.

Hereinafter, reference will be made to FIG. 11 to describe the macroblock size change processing.

The number of blocks that makes up a macroblock (the macroblock size) is set to an initial value (step S11). A decision is then made as to whether the macroblock size is larger than the number of valid blocks (step S12). When the macroblock size is larger than the number of valid blocks, the macroblock size is changed to a smaller value (step S13) and the operation returns to step S12. On the other hand, when the macroblock size is equal to or less than the number of valid blocks, the macroblock size changer instructs the macroblock data generator 14 and the block data generator 15 to use that macroblock size (step S14). Thus, the processing is terminated.

When instructed by the macroblock size changer, the macroblock data generator 14 and the block data generator 15 reproduce block data in accordance with the determined macroblock size.

With the above method, one of predetermined macroblock sizes that defines the number of blocks which makes up one macroblock is selected on the premise that the macroblock header is distributed to each block data quantity comprising macroblock data in equal data amounts. Alternatively, as in the block data group 172 shown in FIG. 13, the macroblock size may be changed successively to the number of blocks to which the macroblock header and the macroblock user data other than dummy data can be distributed.

In the case of FIG. 13, the macroblock size is changed from 12 to 9. The user data in the last three blocks, BLK_UD 10, 11, and 12, is dummy data alone. These dummy data blocks are decided as invalid blocks and coded only when a code does not form a rectangular shape.

A problem is how to allow the reading device to recognize the number of pieces of block data that makes up macroblock data quantity (macroblock size). This can be solved by inserting anew a few bits of data representing the macroblock size into the block header. The block header is drawn in black and white dots in the block header 114 within the block pattern 111 of FIG. 3 except valid/invalid block information.

As described so far, according to the third embodiment, as in the conventional technique, a data structure can be used which allows control information, including correcting capability and interleave length, to be stored in as small an amount as possible in comparison with the data amount of multimedia information to be recorded and moreover the reproducing device to acquire the control information with certainty. Error resistance to linear scratches in the horizontal and vertical directions can be increased. There is no need of imaging useless dummy data as a coded image. By making the macroblock size variable, a minimum code size can be reduced even when the amount of sound information to be recorded is small. Thus, the code size can be minimized, providing greater freedom in layout on paper.

The present invention provides the following advantages:

According to claim 1, by inserting an amount of dummy data less than a predetermined data amount into block data into which data to be recorded is divided after being interleaved, the data is allowed to have a free logical structure and a free size without imposing any constraint on the data structure, such as requires the data to be recorded and the block data to have some relationship therebetween.

According to claim 2, by inserting an amount of dummy data less than a predetermined data amount into block data into which data to be recorded is divided after being interleaved, the data is allowed to have a free logical structure and a free size without imposing any constraint on the data structure, such as requires the data to be recorded and the block data to have some relationship therebetween. In addition, there is no need of imaging useless dummy data as a code, and the code size can be minimized, providing greater freedom in layout on paper.

According to claim 3 and claim 4, by adding invalid block or blocks to recording blocks when blocks cannot be arranged into a given shape, a visually agreeable code shape can be formed. Thereby, the paper layout can be determined in advance.

According to claim 5, by adding invalid block or blocks to recording blocks when blocks cannot be arranged into a given shape, a visually agreeable code of a rectangular shape can be formed. Thereby, the paper layout can be determined in advance.

According to claim 6 and claim 7, control information distributed to invalid blocks as well can be read more reliably on the reproduction side, allowing data to be reproduced more reliably through the use of the control information.

According to claim 8, in addition to allowing control information distributed to invalid blocks as well to be read more reliably on the reproduction side and allowing data to be reproduced more reliably, the code size can be minimized because more useless dummy data is not coded-imaged. This increases freedom in paper layout.

According to claim 9, by inserting an amount of dummy data less than a predetermined data amount into block data into which data to be recorded is divided after being interleaved, the data is allowed to have a free logical structure and a free size without imposing any constraint on the data structure, such as requires the data to be recorded and the block data to have some relationship therebetween.

In addition, there is no need of imaging useless dummy data as a code, and the code size can be minimized, providing greater freedom in layout on paper.

According to claim 10 and claim 11, by adding invalid block or blocks to recording blocks when blocks cannot be arranged into a given shape, a visually agreeable code shape can be formed. Thereby, the paper layout can be determined in advance.

According to claim 12, by adding invalid block or blocks to recording blocks when blocks cannot be arranged into a given shape, a visually agreeable code of a rectangular shape can be formed. Thereby, the paper layout can be determined in advance.

According to claim 13 and claim 14, control information distributed to invalid blocks as well can be read more reliably on the reproduction side, allowing data to be reproduced more reliably through the use of the control information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coded image recording device which, in recording data on a recording medium as an optically readable coded image in which the contents of the data are imaged, subjects the data to an error correcting code generating processing, divides the data into equal amounts of data to produce a plurality of items of block data each having a predetermined amount of data, and arranges a plurality of blocks each having imaged contents of each block data in a given area to thereby record the coded image, comprising:

dummy data inserting means for, when imaging each block data, inserting dummy data into a block whose data amount is less than the predetermined amount of data, said dummy data having a data amount equivalent to a difference between the predetermined amount of data and the data amount of the block whose data amount is less than the predetermined amount of data, and said dummy data not being associated with the data to be recorded into the block.

2. A coded image recording device which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising:

first block producing means for producing a plurality of first blocks each containing a first predetermined amount of first block data, the first block data being obtained by dividing the data into equal amounts of data;

dummy data inserting means for inserting dummy data whose amount is less than the first predetermined amount of data and which is not associated with the data to be recorded into a block, of the plurality of first blocks produced by the first block producing means, in which its block data amount is less than the first predetermined amount of data;

second block producing means for producing a plurality of second blocks each containing a second predetermined amount of second bock data, the first block data being obtained by dividing each first block data into equal amounts of data;

block decision means for making a valid/invalid decision for each of the second blocks produced by the second block producing means, a second block whose second block data are all the dummy data being decided as invalid block; and control means for keeping a second block or blocks for which the valid/invalid decision is invalid from being recorded and imaging the other second blocks for recording.

3. The device according to claim 2, further comprising block array setting means for setting how the second blocks are arrayed on the recording medium, and wherein the control means selects a second block or blocks from the second blocks for which the valid/invalid decision is invalid as a valid block or blocks to be recorded in accordance with a block array set by the block array setting means.

4. The device according to claim 3, wherein, when each of the second blocks is rectangular in shape and the block array setting means sets the block array such that the entire coded image forms a rectangular shape, the control means selects a block or blocks from the second blocks for which the valid/invalid decision is invalid as a valid block or blocks to be recorded so that the entire coded image forms the rectangular shape.

5. The device according to claim 2, wherein, when the first block produced by the first block producing means is one in number and, in addition to data to be recorded as a coded image, contains control information necessary for processing the data, the control means allows all the second blocks for which the valid/invalid decision is invalid to be recorded as valid blocks.

6. The device according to claim 2, wherein, when the first block produced by the first block producing means is one in number and, in addition to data to be recorded as a coded image, contains control information necessary for processing the data, the control information is contained in other second blocks than second blocks for which the valid/invalid decision is invalid.

7. The device according to claim 2, wherein, when the first block produced by the first block producing means is one in number and, in addition to data to be recorded as a coded image, contains control information necessary for processing the data, the first block producing means further comprises changing means for changing the first predetermined amount of data to produce a plurality of first blocks, and the control information is contained in each of the first blocks produced by the changing means as the same control information.

8. A coded image recording method which, in recording data on a recording medium as an optically readable coded image in which the contents of the data are imaged, subjects the data to an error correcting code generating processing, divides the data into equal amounts of data to produce a plurality of items of block data each having a predetermined amount of data, and arranges a plurality of blocks each having imaged contents of each block data in a given area to thereby record the coded image, comprising:

a dummy data inserting step for, when imaging each block data, inserting dummy data into a block whose data amount is less than the predetermined amount of data, said dummy data having a data amount equivalent to a difference between the predetermined amount of data and the data amount of the block whose data amount is less than the predetermined amount of data, and said dummy data not being associated with the data to be recorded into the block.

9. A coded image recording method which, in recording data on a recording medium as an optically readable coded image in which the contents of the data are imaged, interleaves the data, divides the interleaved data into equal amounts of data to produce a plurality of items of block data each having a predetermined amount of data, and arranges a plurality of blocks each having imaged contents of each block data in a given area to thereby record the coded image, comprising:

a first step of producing a plurality of first blocks each containing a first predetermined amount of first block data, the first block data being obtained by dividing the data into equal amounts of data;

a second step of inserting dummy data whose amount is less than the first predetermined amount of data and which is not associated with the data to be recorded into a block, of the plurality of first blocks produced by the first step, in which its block data amount is less than the first predetermined amount of data;

a third step of producing a plurality of second blocks each containing a second predetermined amount of second block data, the first block data being obtained by dividing each first block data into equal amounts of data;

a fourth step of making a valid/invalid decision for each of the second blocks produced by the second step, a second block whose second block data are all the dummy data being decided as an invalid block; and a fifth step of keeping a second block or blocks for which the valid/invalid decision is invalid from being recorded and imaging the other second blocks for recording.

10. The method according to claim 9, further comprising a step of setting how the second blocks are arrayed on the recording medium, and a step of selecting a second block or blocks from the second blocks for which the valid/invalid decision is invalid as a valid block or blocks to be recorded in accordance with a block array set.

11. The method according to claim 10, further comprising, when each of the second blocks is rectangular in shape and the block array is set such that the entire coded image forms a rectangular shape, a step of selecting a block or blocks from the second blocks for which the valid/invalid decision is invalid as a valid block or blocks to be recorded so that the entire coded image forms the rectangular shape.

12. The method according to claim 9, further comprising, when the first block produced is one in number and, in addition to data to be recorded as a coded image, contains control information necessary for processing the data, a step of recording all the second blocks for which the valid/invalid decision is invalid as valid blocks.

13. The method according to claim 9, further comprising, when the first block produced is one in number and, in addition to data to be recorded as a coded image, contains control information necessary for processing the data, a step of including the control information in other second blocks than second blocks for which the valid/invalid decision is invalid.

14. The method according to claim 9, further comprising, when the first block produced is one in number and, in addition to data to be recorded as a coded image, contains control information necessary for processing the data, a step of changing the first predetermined amount of data to produce a plurality of first blocks, and including the control information in each of the first blocks produced as the same control information.

15. A coded image recording device which, in recording data on a recording medium as an optically readable coded image in which the contents of the data are imaged, subjects the data to an error correcting code generating processing to generate an error correcting code, and images the generated error correcting code, to thereby record the coded image, the coded image recording device comprising:

dummy data inserting means for, when the coded image is produced from the error correcting code, and the data amount of the error correcting code to be recorded as the coded image is less than a predetermined amount of data, inserting into the coded image dummy data whose amount is equivalent to a difference between the data amount of the error correcting code and the predetermined amount of data, said inserted dummy data not being associated with the data to be recorded.

16. A coded image recording method which, in recording data on a recording medium as an optically readable coded image in which the contents of the data are imaged, subjects the data to an error correcting code generating processing to generate an error correcting code, and images the generated error correcting code, to thereby record the coded image, the coded image recording method comprising:

dummy data inserting step of, when the coded image is produced from the error correcting code, and the data amount of the error correcting code to be recorded as the coded image is less than a predetermined amount of data, inserting into the coded image dummy data whose amount is equivalent to a difference between the data amount of the error correcting code and the predetermined amount of data, said inserted dummy data not being associated with the data to be recorded.

* * * * *